United States Patent
Lassalle

(10) Patent No.: US 10,745,111 B2
(45) Date of Patent: Aug. 18, 2020

(54) HYDRAULIC ACTUATION CONTROL IN PROPELLERS

(71) Applicant: RATIER-FIGEAC SAS, Figeac (FR)

(72) Inventor: Julien Lassalle, Saint-Jean-Lagineste (FR)

(73) Assignee: RATIER-FIGEAC SAS, Figeac (FR)

(*) Notice: Subject to any disclaimer, the term of this patent is extended or adjusted under 35 U.S.C. 154(b) by 342 days.

(21) Appl. No.: 15/461,901

(22) Filed: Mar. 17, 2017

(65) Prior Publication Data

US 2017/0267329 A1    Sep. 21, 2017

(30) Foreign Application Priority Data

Mar. 18, 2016 (EP) .................................... 16305300

(51) Int. Cl.
| | |
|---|---|
| *B64C 11/40* | (2006.01) |
| *F01D 7/00* | (2006.01) |
| *B64C 11/30* | (2006.01) |
| *F15B 5/00* | (2006.01) |

(52) U.S. Cl.
CPC ............ *B64C 11/40* (2013.01); *B64C 11/301* (2013.01); *F01D 7/00* (2013.01); *F15B 5/006* (2013.01); *F15B 2211/505* (2013.01); *F15B 2211/57* (2013.01)

(58) Field of Classification Search
CPC ....... B64C 11/40; B64C 11/301; B64C 11/38; B64C 11/306; B64C 11/48; B64C 27/10; F01D 7/00; F15B 5/006; F15B 2211/505; F15B 2211/57; F15B 11/10
See application file for complete search history.

(56) References Cited

U.S. PATENT DOCUMENTS

| | | |
|---|---|---|
| 6,077,040 A | 6/2000 | Pruden et al. |
| 7,104,053 B2 | 9/2006 | Gast |
| 8,439,640 B2 | 5/2013 | Arel et al. |
| 8,474,752 B2 | 7/2013 | Kirkland |
| 8,903,570 B2 | 12/2014 | Bailly et al. |

(Continued)

FOREIGN PATENT DOCUMENTS

EP    2457825 A2    5/2012

OTHER PUBLICATIONS

European Search Report for Application No. EP16305300 dated Oct. 28, 2016, 8PAGES.

(Continued)

*Primary Examiner* — Syed O Hasan
(74) *Attorney, Agent, or Firm* — Cantor Colburn LLP

(57) ABSTRACT

A propeller hydraulic actuation system, includes a double-acting dual chamber hydraulic pitch change actuator. The pitch change actuator includes a first pressure circuit having first fluid supply lines and a first hydraulic chamber and a second pressure circuit having second fluid supply lines and a second hydraulic chamber. A piston separates the first and second chambers. At least one pressure sensor is provided for obtaining pressure measurements from which a load differential (F) applied to the piston by the circuits can be calculated. A closed loop controller is arranged to control the fluid supplied to the first and second pressure circuits, wherein the closed loop controller includes an actuator position loop arranged to utilise feedback on the actuator position to control the actuator position.

15 Claims, 2 Drawing Sheets

(56) References Cited

U.S. PATENT DOCUMENTS

| | | | |
|---|---|---|---|
| 2002/0153451 A1 | 10/2002 | Kiss et al. | |
| 2003/0127569 A1* | 7/2003 | Bacon | B64C 13/505 244/195 |
| 2005/0079053 A1* | 4/2005 | Perkinson | B64C 11/40 416/98 |
| 2010/0014976 A1* | 1/2010 | Arel | B64C 11/38 416/117 |
| 2011/0002786 A1* | 1/2011 | Perkinson | B60V 1/14 416/154 |
| 2011/0239853 A1* | 10/2011 | Wheater | G05D 3/125 91/165 |

OTHER PUBLICATIONS

Tafraouti M, The thesis "Contribution a la modelisation et la commande des systemes electrohydrauliques", Universite Henri Poincare, Nov. 17, 2006. 164 pages.

\* cited by examiner

HYDRAULIC ACTUATION CONTROL IN PROPELLERS

FOREIGN PRIORITY

This application claims priority to European Patent Application No. 16305300.2 filed Mar. 18, 2016, the entire contents of which is incorporated herein by reference.

Technical Field

The present invention relates to propeller hydraulic actuation systems, such as propeller pitch change actuators. In particular, the invention relates to improved hydraulic actuation control in such propeller systems.

BACKGROUND OF THE INVENTION

Hydraulic actuation systems that use hydraulic power to facilitate mechanical motion (e.g. linear, rotary or oscillatory motion) have many uses across a range of technologies. Hydraulic actuators typically comprise a hollow tube along which a piston can slide and can be single-acting or double-acting. In a double-acting actuator, hydraulic fluid pressure is applied from a chamber on each side of a piston, and the pressure differential between the two chambers moves the piston one way or the other. The movement of the piston provides an actuation force.

A common use for double-acting hydraulic actuators is within propeller pitch control systems, such as pitch change actuators for variable pitch propellers. Variable pitch propellers are employed on many different types of vehicles, such as aircraft. Typically, propeller blades are mounted to a rotary hub for pivotable movement about their longitudinal axis to permit pitch adjustment. The pitch adjustment is controlled by a double-acting hydraulic pitch change actuator housed within the rotating hub assembly. On one side of the piston is an "increase pitch pressure chamber" and on the other side a "decrease pitch pressure chamber", with the differential pressure between the two moving the piston so as to cause the pitch angle to increase or to decrease. The pitch change actuator is operated by a flow metering valve such as an electrohydraulic servo valve or direct drive servo valve, for selectively pressuring the pitch change actuator piston to effectuate a desired change in pitch of the propeller blades, which in turn is controlled by a closed-loop control system.

Pitch change actuators are well known in the prior art, for example in U.S. Pat. No. 8,439,640 B2.

In the closed-loop control systems of the prior art, the engine control system provides the inputs to a position loop, which controls the position of the propeller pitch actuator (and thereby the pitch of the blades). In order to minimise possible interactions with other powerplant systems, the position loop has a specific bandwidth and operates at a given frequency (i.e. the frequencies encompassed by the position loop bandwidth are distinct from the frequencies of other systems in order to allow decoupling from the engine power and rotational speed control loops for instance).

However, the present inventor has observed position loop instabilities induced by coupling phenomenon with other control loops embedded in the powerplant and running in parallel with the propeller position loop. Identified possible interactions are with:

the propeller and engine rotational speed regulation
the engine power regulation
the engine torque control
propeller synchrophasing loops
any controls embedded within engine turbomachinery
Aircraft control systems These interactions often occur when the various loops operate at similar frequencies. Although the control loops will be designed to operate at different frequencies that should not interact, for many reasons the operating frequency of any of the control loops can shift over time (hardware ageing, manufacturing tolerances, change in aircraft & engine operating conditions, maintenance operations etc.), causing loops to then operate at similar frequencies and interact.

The present disclosure seeks to address the above described issues.

The thesis "Contribution a la modelisation et la commande des systemes electrohydrauliques", Tafraouti M, Universite Henri Poincare, 17 Nov. 2006 discusses the theory behind control loops used in electrohydraulic systems. At chapter 2, section 2.5.4.2, use of feedback of the pressure differential or acceleration to improve the damping of the system and increasing the frequency range of the bandwidth is discussed. A preliminary theoretical analysis is presented of the potential benefits of adding an inner load loop to the classical position loop of a hydraulic system.

U.S. Pat. No. 7,104,053 describes a control method for controlling the operation of an actuation system comprising first and second actuator arrangements arranged to drive a common element, for example driving a flight control surface of an aircraft wing. The aim is to equalise the force applied by the two actuators, to avoid stress and system inefficiency. The method uses a single pressure sensor to measure the differential pressure between the two chambers of each actuator from which the load applied to the control surface by the actuator piston can be calculated. The demand signals applied to each actuator are adjusted to compensate for any difference in the actuator loads.

U.S. Pat. No. 8,474,752 similarly relates to flight control actuator force equalisation. Each of a plurality of actuators is provided with a force sensor that senses the pressure difference across the actuator piston, i.e. providing a delta pressure signal. The applied force per piston can thus be determined and the difference in forces between the actuators used to equalise the forces across the control surface.

SUMMARY

From one aspect, the present disclosure provides a propeller pitch change hydraulic actuation system, comprising: a double-acting dual chamber hydraulic pitch change actuator comprising: a first pressure circuit having first fluid supply lines and a first hydraulic chamber; a second pressure circuit having second fluid supply lines and a second hydraulic chamber; a piston separating the first and second chambers; at least one pressure sensor for obtaining pressure measurements from which a load differential applied to the piston by the circuits can be calculated; and a closed loop controller arranged to control the fluid supplied to the first and second pressure circuits, wherein the closed loop controller includes an actuator position loop arranged to utilise feedback on the actuator position to control the actuator position; wherein the closed loop controller further includes, within the actuator position loop, an inner load loop created utilising the load differential calculated from the pressure measurements obtained by the at least one pressure sensor.

In an embodiment of the disclosure, the at least one pressure sensor may be a differential pressure sensor arranged to measure the pressure differential between the first and second pressure circuits.

In another embodiment, the system may comprise two pressure sensors, one located in each pressure circuit, each pressure sensor being arranged to measure the pressure in the circuit in which it is located. The pressure sensors may be located in the fluid supply lines or hydraulic chambers. In embodiments, the closed loop controller may be arranged to determine the pressure differential between the first and second pressure circuits from the pressure measurements in each circuit.

In embodiments, the closed loop controller may be arranged to calculate the load differential applied to the piston, utilising the pressure measurement(s) and the working area of the piston.

In embodiments, the system may further comprise a flow metering valve controlled by the closed loop controller, wherein the flow metering valve is arranged to supply fluid pressure and flow to the first and second fluid circuits according to the control of the closed loop controller; and wherein optionally the flow metering valve is an electrohydraulic servo valve or a direct drive servo valve.

In embodiments, the first fluid supply lines may comprise supply lines between the flow metering valve and the first chamber, and the second fluid supply lines may comprise supply lines between the flow metering valve and the second chamber.

In embodiments, the first pressure circuit may be an increase pitch pressure circuit that acts to increase the pitch of blades of the propeller; and the second pressure circuit may be a decrease pitch pressure circuit that acts to decrease the pitch of blades of the propeller.

From another aspect, this disclosure provides a method of controlling the pitch of a variable pitch propeller, comprising: selectively applying fluid pressure and flow to first and second pressure circuits in a double-acting dual chamber hydraulic pitch change actuator so as to control the position of a piston separating first and second chambers of the first and second pressure circuits respectively; wherein the fluid pressure and flow applied to the first and second pressure circuits is controlled by a closed loop controller that includes an actuator position control loop; obtaining pressure measurements from which a load differential applied to the piston by the pressure circuits can be calculated; calculating a load differential applied to the piston by the pressure circuits; and creating a load loop within the actuator position control loop utilising the calculated load differential.

In one embodiment, the pressure measurements may be obtained utilising a differential pressure sensor that measures the pressure differential between the first and second pressure circuits. In another embodiment, the pressure measurements may be obtained utilising a pressure sensor located in each circuit. Each pressure circuit may comprise fluid supply lines and a respective chamber, and the pressure sensors may be located in the fluid supply lines or chambers.

In embodiments, the method may further comprise supplying fluid pressure and flow to the first and second pressure circuits utilising a flow metering valve, optionally an electro-hydraulic servo valve or a direct drive servo valve, which is controlled by the closed loop controller.

In embodiments, the first pressure circuit may act to increase the pitch of blades of the propeller; and the second pressure circuit may act to decrease the pitch of blades of the propeller.

BRIEF DESCRIPTION OF THE DRAWINGS

Some exemplary embodiments of the present disclosure will now be described by way of example only and with reference to the accompanying drawings, in which:

FIG. 3b is a more detailed block diagram of the position and load loops of FIG. 3a.

DETAILED DESCRIPTION

Figure 1:
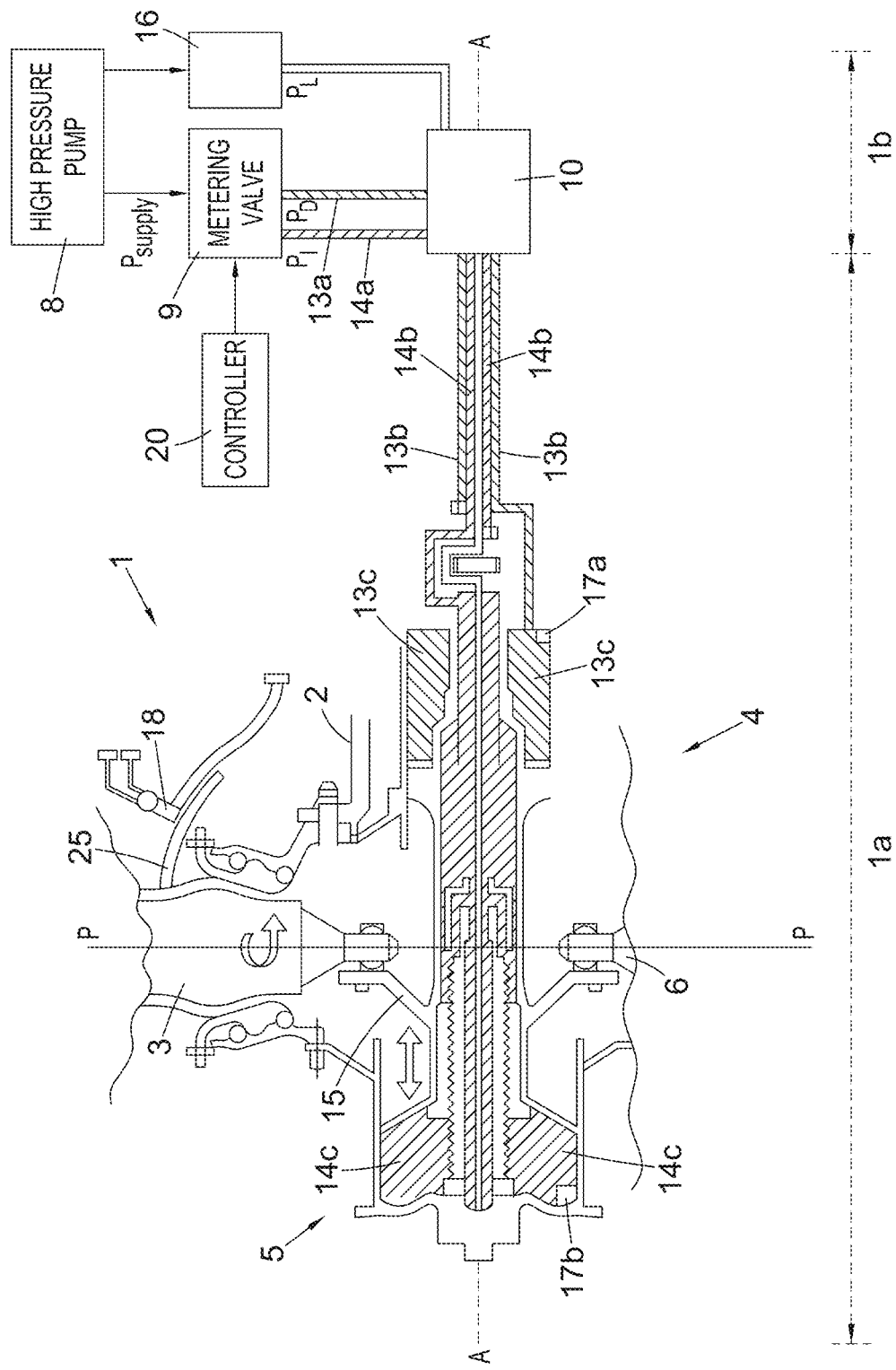
FIG. 1 is a simplified schematic sectional view and block diagram of part of an exemplary propeller system utilizing an embodiment of a propeller pitch change hydraulic actuation system in accordance with this disclosure.
Figure 2:
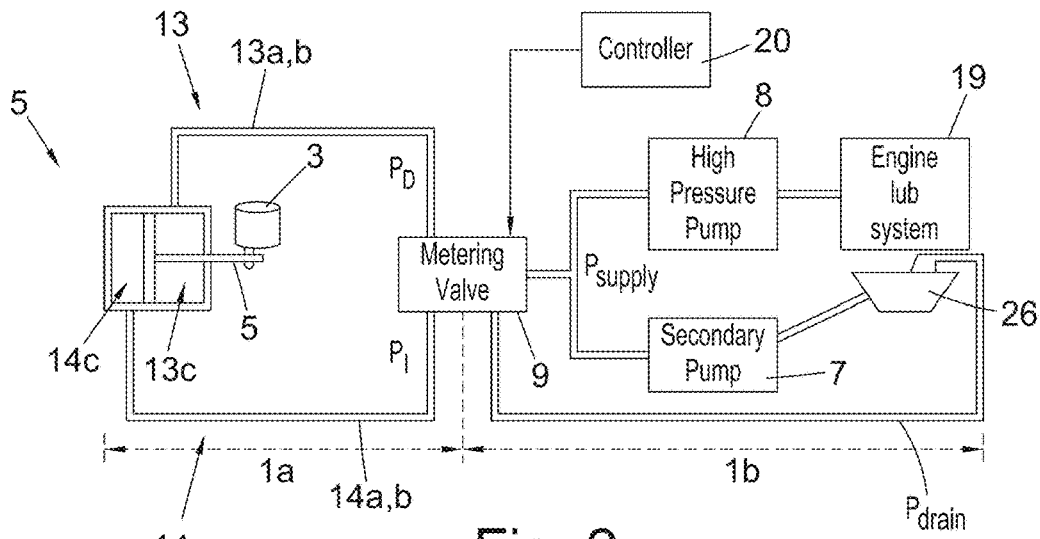
FIG. 2 is a simplified block diagram of the oil system architecture employed in the embodiment of FIG. 1.

With reference firstly to FIGS. 1 and 2, an exemplary propeller system utilizing an embodiment of a propeller pitch change hydraulic actuation system in accordance with this disclosure is illustrated.

A propeller system 1 is driven by a gas turbine engine, e.g. a turboprop, (not shown in FIG. 1), and comprises both a rotating part 1a and a static part 1b. The engine drives a propeller shaft 2 which rotates propeller hub 4 and a plurality of propeller blades extending therefrom (of which the blade root 3 of one of the blades can be seen in FIG. 1).

An hydraulic double-acting dual chamber pitch change actuator 5 having a piston 15 (also known as a "yoke") is provided that controls the pitch of the blades, and is connected to each blade root via a trunnion pin 6 extending from each blade.

The pitch change actuator 5 is driven by high pressure pump 8 utilising oil from the engine lubrication system 19 (see FIG. 2) located in the static part 1b of the engine. Hydraulic supply pressure Psupply is provided to a metering valve 9, which in the described embodiment is an electrohydraulic servo valve but in other embodiments may be any other suitable metering valve such as a direct drive servo valve for instance by the high pressure pump 8. A secondary pump 7 (an auxiliary electrical pump) is also provided in case of failure of the main supply circuit (i.e. engine lubrication system 19, pump 8 and the supply lines therebetween) which has a dedicated auxiliary tank 26 fed by propeller system drain flow of the metering valve (Pdrain line).

Hydraulic fluid is also supplied to pitchlock valve 16, which provides a pitch lock pressure PL to a pitchlock system, this is shown in FIG. 1 but not FIG. 2. Pitchlock systems are well known in the art and will not be further described here.

The metering valve 9 (which is controlled by closed loop controller 20, described later) supplies fluid pressure and flow to the actuator 5. An "increase pitch" fluid pressure PI and a "decrease pitch" fluid pressure PD are provided via supply lines 14a and 13a respectively to a hydrodynamic bearing 10 which transmits these fluid pressures from the static part 1b to the rotating part 1a of the propeller.

Increase pitch fluid pressure PI is transmitted from the hydrodynamic bearing 10 to an increase pitch pressure chamber 14c of the pitch change actuator 5, via supply line 14b (a transfer tube). Decrease pitch pressure PD is transmitted from the hydrodynamic bearing 10 to a decrease pitch pressure chamber 13c of the pitch change actuator 5, via supply line 13b (a transfer tube). The supply lines 14a, 14b together with the increase pitch pressure chamber 14c may together be considered as an "increase pitch pressure circuit" 14, whilst the supply lines 13a, 13b together with the decrease pitch pressure chamber 13c may together be considered as a "decrease pitch pressure circuit" 13.

A pitch change actuator piston 15 is arranged to translate along axis A (as illustrated by the arrow in FIG. 1) and is driven by the differential pressure between the increase pitch pressure circuit 14 and the decrease pitch pressure circuit 13. The movement of the pitch change actuator piston 15 thereby alters the pitch of the blade in the normal way by rotating the blade around the axis P. The metering valve 9 thus manipulates the increase and decrease pitch pressure applied so as to adjust the piston position and thereby the blade pitch.

Propeller pitch sensors 18 are provided on each propeller blade 3 which continuously monitor the pitch of the blade. These enable pitch measurements through a pattern of targets 25 installed on some or all of the blades and on the propeller hub (or any part rotating with the hub). The pitch measurements 34 are fed back to the closed loop controller 20. The use of these pitch measurements 34 are discussed later with reference to FIG. 3*a*.

According to embodiments of the present disclosure, the differential load (force) applied to the piston is determined. This can be done utilising pressure measurements together with knowledge of the working areas of the piston, as will be described later. The pressure in each of the decrease pitch pressure circuit 13 and increase pitch pressure circuit 14 may be measured using a pressure sensor located within each circuit. The pressure sensors may be any suitable type of pressure sensor known in the art (such as gauge pressure sensors). In the illustrated embodiment, pressure sensor 17*a* is shown located in the decrease pitch pressure chamber 13*c* to measure the "decrease pitch pressure" PDm and a pressure sensor 17*b* is shown located in the increase pitch pressure chamber 14*c* to measure the "increase pitch pressure" PIm. However, they could be located anywhere in the decrease pitch and increase pitch circuits respectively, i.e. not only in the chambers 13*c*, 14*c* but anywhere in the supply lines 13*a*, 14*a*, 13*b*, 14*b* between the metering valve 9 and the chambers. The important point is that they are situated so as to be able to adequately measure the pressure. Pressure measurements PDm, PIm, are collected continuously and provided to the closed loop controller 20.

In another embodiment (not illustrated), instead of measuring the pressure in each of the pressure circuits (i.e. using two pressure sensors), the pressure differential between the circuits is measured using one differential pressure sensor.

Figure 3A:
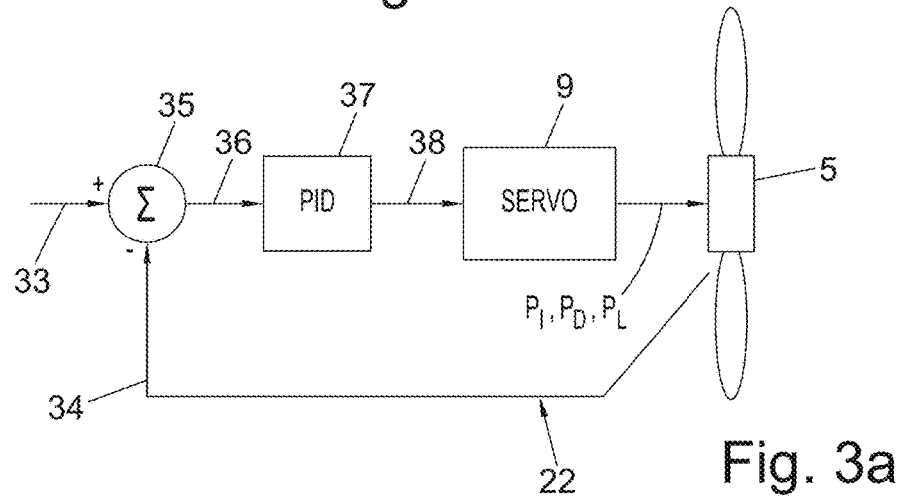
FIG. 3a is a simplified block diagram of the control loops employed in the closed loop controller utilised in the embodiment of FIG. 1.

Control provided by the closed loop controller 20 for controlling the pitch change actuator 5, in accordance with this disclosure, will now be described with reference to FIGS. 3*a* and 3*b*. FIG. 3*a* is a simplified block diagram of control loops utilized in the closed loop controller 20, which is shown in more detail in FIG. 3*b*. It should be noted that the load loop illustrated in FIG. 3*b* and discussed below is not shown in FIG. 3*a*, for simplicity.

The closed loop controller 20 utilises a position control loop 22 to control the position of the actuator 5 and thereby the pitch of the blades 3, in accordance with known systems. In addition, in accordance with the present disclosure, a load loop 23 is provided inside the position control loop 22 (only shown in FIG. 3*b*). These loops will now be described.

The target blade pitch 33 (provided for example by an external propeller rotational speed control loop as known in the art) is subject to correction utilizing the position control loop 22. Referring firstly to the simplified diagram of FIG. 3*a*, the target blade pitch 33 is compared at block 35 with the measured blade pitch 34 obtained from blade pitch sensors 18 (see FIG. 1). The difference (error) between target pitch 33 and measured pitch 34, i.e. the pitch correction 36 to be applied, is input to PID controller 37. The resulting signal 38 is input to the metering valve (in this embodiment an electrohydraulic servo valve) 9, that converts the electrical signal representing the pitch, to hydraulic flow signals to provide that pitch. The flows supplied to the actuator will generate the pressure in the actuator supply circuits (i.e. PI, PD). These hydraulic flows are provided to the pitch change actuator 5 as described above in relation to FIGS. 1 and 2.

According to embodiments of the present disclosure, a load loop 23 inside the position loop 22 is provided. This is illustrated in the more detailed block diagram of FIG. 3*b*, which is a Laplace block diagram representation, based, for simplicity, on a symmetric actuator in a medium position (where both chambers have the same volume).

Figure 3B:
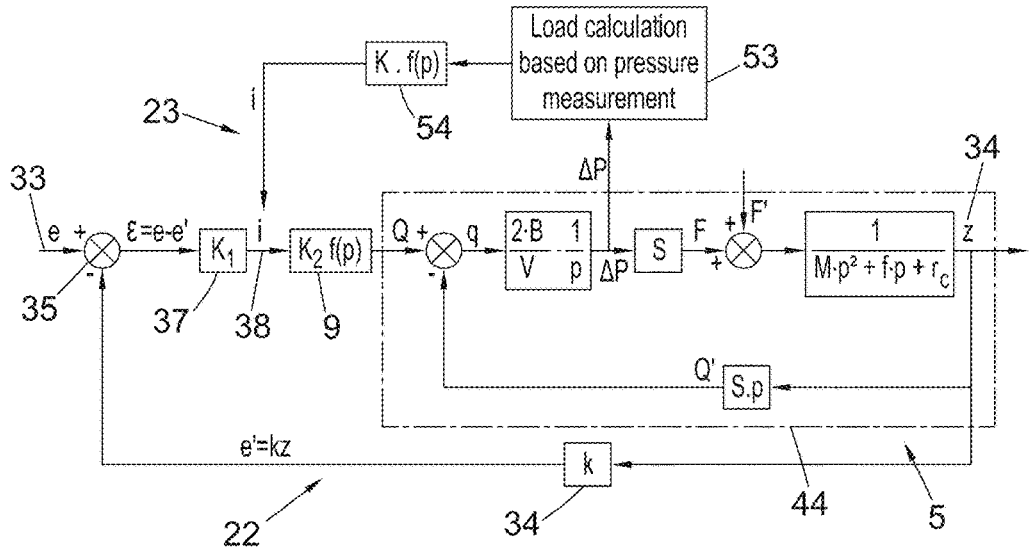

In FIG. 3*b*, the following notation is used:
"Q" is the outlet of the metering valve (in this embodiment a servo valve) 9, i.e. the flow entering in the actuator 5, 44.
"B" is the bulk modulus of the hydraulic fluid i.e. the oil (a key physical parameter that drives the physics of the actuator)
"V" is the volume of the chambers 13*c*, 14*c*
"ΔP" is the pressure differential between the pitch pressure circuits 13, 14
"S" is the working area of the piston
"F" is the actuator load differential induced by the pressures inside the chambers (i.e. the load differential applied to the piston)
"F'" is the external load/perturbation coming from the blades
"$Mp^2+f.p+r_c$" is the dynamic equation of the piston plus the equivalent blade inertia
"Q'" is the flow calculated based on piston translation
"q" is the difference between Q and Q' (an intermediate flow calculation that enables running the calculation of the actuator dynamic).

FIG. 3*b*, like FIG. 3*a*, shows that the measured blade pitch 34 ("e'") is input to block 35 where it is compared with the target blade pitch 33 ("e") and the difference between them is calculated. This is the pitch correction 36 (ε) to be applied. The remainder of the control loop is shown in more detail than in FIG. 3*a*. Loop 44 (shown within a dotted line) is the Laplace block diagram for a dual chamber symmetric actuator. A symmetric actuator linearized around a medium position is represented in FIG. 3*b* as a matter of simplicity, however the disclosure can also be applied to non-symmetric actuators.

The pitch correction 36 is input to PID controller 37 (marked here as "K1"), which amplifies and corrects the signal to produce amplified current i (signal 38) which is input to metering valve (electrohydraulic servo valve) 9. The servo valve 9 converts the electrical input into a rated flow "Q" (i.e. hydraulic fluid pressures PI, PD) that enters the actuator 5 (represented here by the Laplace diagram 44 as discussed above). The resultant pitch angle of the blades 3 is measured by propeller pitch sensors 18 (pitch measurements 34, represented in FIG. 3*b* as "z"). This is provided as feedback 34 to close the position loop 22.

In alternative embodiments, instead of using the pitch angle in the position loop, the axial position of the piston 15 can be used since the position of the piston is indicative of a particular pitch angle. Thus, instead of pitch sensors 18, a sensor (such as an LVDT linear variable differential transformer) can be provided to measure the axial piston position. The position loop 22 can then use a target piston position and measured piston position in place of the target blade pitch 33 and measured blade pitch 34.

The load loop 23 shown in FIG. 3*b* will now be described. This load loop (force loop) is created by back-calculating the applied loads using the decrease pitch pressure PDm and increase pitch pressure $P_{Im}$ measurements made by the pressure sensors 17a and 17b respectively. The load applied by the decrease pitch pressure circuit on the piston, $L_{DP}$ can be calculated as:

$$L_{DP} = P_{Dm} * A_D$$

where $A_D$ is the working area of the decrease pitch side of the piston

Whilst the load applied by the increase pitch pressure circuit on the piston, $L_{IP}$ can be calculated as:

$$L_{IP} = P_{Im} * A_I$$

where $A_I$ is the working area of the increase pitch side of the piston

Having calculated these loads applied by each of the circuits 13, 14 on the piston 15, the net load ("differential load") applied as a result of both pressures on the piston can be calculated by simple subtraction:

$$\text{Differential load, } F = L_{DP} - L_{IP} = (P_{DM} * A_D) - (P_{IM} * A_I)$$

In the illustrated load loop 23, this differential load F calculation is carried out at step 53. The differential load is input to correction block 54 to convert the load F into a current correction i which fed into the position loop As discussed above, in some embodiments, instead of providing one pressure sensor in each of the increase pitch and decrease pitch circuits, one differential pressure sensor may be provided to measure the differential pressure $P_{dif}$ between the circuits. The differential load F can then be more simply calculated as:

$$\text{Differential load, } F = P_{dif} * R * A$$

Where:

A is a piston working area (e.g. $A_D$ or $A_I$)

R is a piston working area ratio (which will depend on the piston working area chosen as the reference surface e.g. $A_D$ or $A_I$)

In some embodiments, the provision of this load loop provides some important advantages. Firstly, it has a stabilization effect on the position loop thus stabilizing the pitch control and enhancing actuator position control performance. Secondly, it increases (widens) the bandwidth of the position loop which allows a larger range for setting the position loop operating frequency. This larger range would then allow to put in place a better decoupling strategy with other systems and make the overall system more robust against loop interactions and bandwidth shifting over time. It is envisaged that the bandwidth of the position loop may be increased by a factor of 1.5, based on the theoretical analysis carried out by Tafraouti (see Background).

Whilst the exemplary propeller pitch change hydraulic actuation system has been described in relation to an aircraft propeller, e.g. a turboprop, the skilled person will understand that the present disclosure is equally applicable to other propellers, such as those used on ships.

The above description is of specific embodiments only and it will be appreciated that variations may be made to the embodiments without departing from the broad scope of the disclosure as defined by the following claims.

The invention claimed is:

1. A propeller pitch change hydraulic actuation system, comprising: a double-acting dual chamber hydraulic pitch change actuator comprising:
   a first pressure circuit having first fluid supply lines and a first hydraulic chamber;
   a second pressure circuit having second fluid supply lines and a second hydraulic chamber;
   a piston separating the first and second chambers;
   at least one pressure sensor for obtaining pressure measurements from which a load differential applied to the piston by the circuits can be calculated; and
   a closed loop controller arranged to control the fluid supplied to the first and second pressure circuits, wherein the closed loop controller includes:
   an actuator position loop arranged to utilise feedback on the actuator position to control the actuator position; and
   an inner load loop within the actuator position loop created utilising the load differential calculated from the pressure measurements obtained by the at least one pressure sensor, the inner load loop arranged to feed a current correction to the actuator position loop in order to stabilise control of the actuator position loop on the actuator position.

2. A system as claimed in claim 1, wherein the at least one pressure sensor is a differential pressure sensor arranged to measure the pressure differential between the first and second pressure circuits.

3. A system as claimed in claim 1, comprising two pressure sensors, one located in each pressure circuit, each pressure sensor being arranged to measure the pressure in the circuit in which it is located.

4. A system as claimed in claim 3, wherein the pressure sensors are located in the fluid supply lines or hydraulic chambers.

5. A system as claimed in claim 3, wherein the closed loop controller is arranged to determine the pressure differential between the first and second pressure circuits from the pressure measurements in each circuit.

6. A system as claimed in claim 1, wherein the closed loop controller is arranged to calculate the load differential applied to the piston, utilising the pressure measurement(s) and the working area of the piston.

7. A system as claimed in claim 1, further comprising a flow metering valve controlled by the closed loop controller, wherein the flow metering valve is arranged to supply fluid pressure and flow to the first and second fluid circuits according to the control of the closed loop controller; and wherein optionally the flow metering valve is an electrohydraulic servo valve or a direct drive servo valve.

8. A system as claimed in claim 7, wherein the first fluid supply lines comprise supply lines between the flow metering valve and the first chamber, and the second fluid supply lines comprise supply lines between the flow metering valve and the second chamber.

9. A system as claimed in claim 1, wherein the first pressure circuit is an increase pitch pressure circuit that acts to increase the pitch of blades of the propeller; and wherein the second pressure circuit is a decrease pitch pressure circuit that acts to decrease the pitch of blades of the propeller.

10. A method of controlling the pitch of a variable pitch propeller, comprising:
   selectively applying fluid pressure and flow to first and second pressure circuits in a double-acting dual chamber hydraulic pitch change actuator so as to control the position of a piston separating first and second chambers of the first and second pressure circuits respectively; wherein the fluid pressure and flow applied to the first and second pressure circuits is controlled by a closed loop controller that includes an actuator position loop;

obtaining pressure measurement(s) from which a load differential applied to the piston by the pressure circuits can be calculated;

calculating a load differential applied to the piston by the pressure circuits;

creating an inner load loop within the actuator position control loop utilising the calculated load differential; and stabilising the control of the actuator position loop on the fluid pressure and flow applied to the first and second pressure circuits by feeding a current correction to the actuation position loop from the inner load loop.

11. A method as claimed in claim 10, wherein the pressure measurement(s) are obtained utilising a differential pressure sensor that measures the pressure differential between the first and second pressure circuits.

12. A method as claimed in claim 10, wherein the pressure measurements are obtained utilising a pressure sensor located in each circuit.

13. A method as claimed in claim 12, wherein each pressure circuit comprises fluid supply lines and a respective chamber, and wherein the pressure sensors are located in the fluid supply lines or chambers.

14. A method as claimed in claim 10, further comprising supplying fluid pressure and flow to the first and second pressure circuits utilising a flow metering valve, optionally an electro-hydraulic servo valve or direct drive valve, which is controlled by the closed loop controller.

15. A method as claimed in claim 10, wherein the first pressure circuit acts to increase the pitch of blades of the propeller; and wherein the second pressure circuit acts to decrease the pitch of blades of the propeller.

* * * * *